United States Patent
Vidhi et al.

(10) Patent No.: US 12,387,137 B2
(45) Date of Patent: Aug. 12, 2025

(54) PROCESSING IMAGES OF WIND FARMS AND PLANT FARMS CAPTURED BY A DRONE

(71) Applicant: INVENTUS HOLDINGS, LLC, Juno Beach, FL (US)

(72) Inventors: Rachana Vidhi, Palm Beach Gardens, FL (US); Prasanna Shrivastava, Palm Beach Gardens, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 555 days.

(21) Appl. No.: 17/677,321

(22) Filed: Feb. 22, 2022

(65) Prior Publication Data

US 2023/0267364 A1    Aug. 24, 2023

(51) Int. Cl.
*G06N 20/00*    (2019.01)
*F03D 17/00*    (2016.01)
(Continued)

(52) U.S. Cl.
CPC ............. *G06N 20/00* (2019.01); *F03D 17/00* (2016.05); *G06T 7/11* (2017.01); *G06N 3/02* (2013.01);
(Continued)

(58) Field of Classification Search
CPC .......... G06N 20/00; G06N 3/02; G06N 3/044; G06N 7/01; G06N 3/0464; G06N 3/092; G06N 3/045; F03D 17/00; F03D 80/509; F03D 17/003; F03D 17/007; G06T 7/11; G06T 2207/10032; G06T 2207/20081;
(Continued)

(56) References Cited

U.S. PATENT DOCUMENTS 8,545,187 B2 * 10/2013 Presz, Jr. ............... F03D 80/00
                                                            416/246
9,470,579 B2    10/2016 Ritter et al.
(Continued)

FOREIGN PATENT DOCUMENTS

EP        2 527 649 A1    11/2012
WO    WO-2020156629 A1 *  8/2020  ............. F03D 17/00

OTHER PUBLICATIONS

"Shang Zhang, an Improved Algorithm for Wind Turbine Blade Defect Detection, Oct. 18, 2022, IEEE Access, Version 23, pp. 1-11" (Year: 2022).*

(Continued)

*Primary Examiner* — Andrew W Bee
*Assistant Examiner* — D J Dhooge
(74) *Attorney, Agent, or Firm* — Tarolli, Sundheim, Covell & Tummino LLP (57) ABSTRACT

An artificial intelligence (AI) ensemble engine analyzes a set of images that include a wind turbine and a region of a plant farm to identify potential problem areas in the wind turbine and the plant farm. The AI ensemble engine also analyzes the potential problem areas of the wind turbine and the plant farm to determine whether maintenance is warranted for the potential problem areas to provide a list of problem areas. A notification manager determines whether each problem area in the list of problem areas is related to a wind turbine or agriculture and generates a notification based on the determination.

20 Claims, 8 Drawing Sheets

(51) Int. Cl.
*G06N 3/02* (2006.01)
*G06T 7/11* (2017.01)

(52) U.S. Cl.
CPC ............... *G06T 2207/10032* (2013.01); *G06T 2207/20081* (2013.01)

(58) Field of Classification Search
CPC . G06T 2207/20084; G06T 2207/30108; G06T 7/0004; G06V 10/82; G06V 20/17; G06V 20/176
See application file for complete search history.

(56) References Cited

U.S. PATENT DOCUMENTS

| | | | |
|---|---|---|---|
| 10,231,441 | B2 | 3/2019 | Horton |
| 2012/0136630 | A1 | 5/2012 | Murphy |
| 2015/0278640 | A1* | 10/2015 | Johnson ............... G06V 20/188 382/110 |
| 2018/0003161 | A1 | 1/2018 | Michini et al. |
| 2018/0230967 | A1* | 8/2018 | Beatrice ................. F03D 7/028 |
| 2018/0286141 | A1* | 10/2018 | Van de Cotte .......... H04L 67/12 |
| 2020/0049129 | A1* | 2/2020 | Girardot ............... F03D 7/0224 |
| 2020/0225655 | A1* | 7/2020 | Cella ................ G05B 19/41875 |
| 2020/0327264 | A1* | 10/2020 | Wang ...................... H02J 3/008 |
| 2021/0110724 | A1 | 4/2021 | Wake et al. |
| 2021/0210170 | A1* | 7/2021 | Gardner ................. G16H 70/40 |
| 2021/0246881 | A1* | 8/2021 | Priore, III ............. G01M 13/02 |
| 2022/0065228 | A1* | 3/2022 | Ponnada ................. F03D 17/00 |

OTHER PUBLICATIONS

Stetco, Adrian, et al., "Machine learning methods for wind turbine condition monitoring: A review", Renewable Energy 133 (2019) 620-635.

Yuan, Yuan, et al., "Advanced agricultural disease image recognition technologies: A review", Information Processing in Agriculture, pp. 1-12, available at www.sciencedirect.com.

Ciaburro, Giuseppe, et al., "Machine Learning-Based Tools for Wind Turbine Acoustic Monitoring", Appl. Sci. 2021, 11, 6488, https:/doi.org/10.3390/app11146488, pp. 1-17.

* cited by examiner

PROCESSING IMAGES OF WIND FARMS AND PLANT FARMS CAPTURED BY A DRONE

TECHNICAL FIELD

The present disclosure relates to image processing and more particularly to systems and methods for processing images of wind farms and plant farms captured by a drone.

BACKGROUND

An unmanned aerial vehicle (UAV) (or uncrewed aerial vehicle) is commonly referred to as a drone. A drone is an aircraft without a human pilot on board and a type of unmanned vehicle. Drones are a component of an unmanned aircraft system (UAS); which include a drone, a ground-based controller, and a system of communications between the two. The flight of drones may operate with various degrees of autonomy: either under remote control by a human operator or autonomously by onboard computers.

Compared to crewed aircraft, drones were originally used for missions too "dull, dirty or dangerous" for humans. While drones originated mostly in military applications, the use of drones use is rapidly expanding to commercial, scientific, recreational, agricultural and other applications, such as policing and surveillance, product deliveries, aerial photography, infrastructure inspections, smuggling and drone racing.

A wind turbine is a device that converts the wind's kinetic energy into electrical energy. Wind turbines are manufactured in a wide range of vertical and horizontal axes. The smallest wind turbines are used for applications such as battery charging for auxiliary power for boats or caravans or to power traffic warning signs. Slightly larger turbines can be used for making contributions to a domestic power supply while selling unused power back to the utility supplier via the electrical grid. Arrays of large turbines, known as windfarms, are used by many countries as part of a strategy to reduce reliance on fossil fuels.

A windfarm is a group of wind turbines in the same location used to produce electricity. A large windfarm may have several hundred individual wind turbines and cover an extended area of hundreds of square miles, and the land between the turbines may be used for agricultural or other purposes.

Machine learning is a subset of artificial intelligence in the field of computer science that employs statistical techniques to give computers the ability to "learn" (e.g., progressively improve performance on a specific task) with data, without being explicitly programmed.

SUMMARY

One example relates to a non-transitory machine readable medium having machine readable instructions. The machine readable instructions include an artificial intelligence (AI) ensemble engine that analyzes a set of images that include a wind turbine and a region of a plant farm to identify potential problem areas in the wind turbine and the plant farm. The AI ensemble engine also analyzes the potential problem areas of the wind turbine and the plant farm to determine whether maintenance is warranted for the potential problem areas to provide a list of problem areas. The medium also includes a notification manager that determines whether each problem area in the list of problem areas is related to a wind turbine or agriculture and generates a notification based on the determination.

Another example relates to a system for analyzing images that includes a drone that captures a set of images, the set of images including images of a wind turbine on a wind farm and images of a region of a plant farm proximal to the wind farm. The system also includes an AI ensemble engine operating on one or more computing devices that analyzes the set of images to identify potential problem areas with the wind turbine and the plant farm and analyzes the potential problem areas of the wind turbine and the plant farm to determine whether maintenance is warranted for the potential problem areas to generate a list of problem areas. The system further includes a notification manager operating on the one or more computing devices that determines whether each problem area in the list of problem areas is related to a wind turbine or agriculture and generates a notification based on the determination.

Yet another example relates to a method for processing images. The method includes receiving, by an image processing system operating on one or more computing devices, a set of images captured by a drone surveying a wind farm with wind turbines and/or a plant farm. The method also includes identifying, by machine learning modules operating on the one or more computing devices, potential problem areas related to wind turbines or plant farms in the set of images, wherein the machine learning modules are trained to recognize features related to wind turbines and plant farms. The method further includes analyzing, by a feature analyzer operating on the one or more computing devices, the potential problem areas to determine problem areas related to the wind turbines and/or the plant farm. The method yet further includes determining, by a notification manager operating on the one or more computing devices, a maintenance needed for each problem area.

DETAILED DESCRIPTION

This disclosure relates to systems and methods for processing images received from a drone surveying a wind farm proximal to a plant farm or vice versa. It is common for a wind farm of wind turbines to be situated in a region proximal to plant farms for vegetation growth. Accordingly, images captured by the drone possibly include both an image of a wind turbine and an image of a portion of a plant farm.

In some examples, the images of the plant farm are inadvertently captured when the drone is surveying wind turbines on the wind farm. Similarly, in some examples, images of a wind turbine on a wind farm are inadvertently captured when the drone is surveying the plant farm, or some portion thereof. In either situation, problems related to wind turbines may be misattributed to the plant farm, or vice versa if the system processing the images is not specifically trained. For instance, a crack in a plate or blade on a wind turbine could be misattributed to an area of erosion (e.g., due to lack of water) of the plant farm if a machine learning module was only trained to identify issues related to plant farms.

Accordingly, the systems described herein include one or more machine learning modules that are specifically trained to recognize features related to both wind farms and plant farms. In this manner, features that would conventionally be misattributed are correctly identified, such that maintenance crews are correctly deployed.

Figure 1:
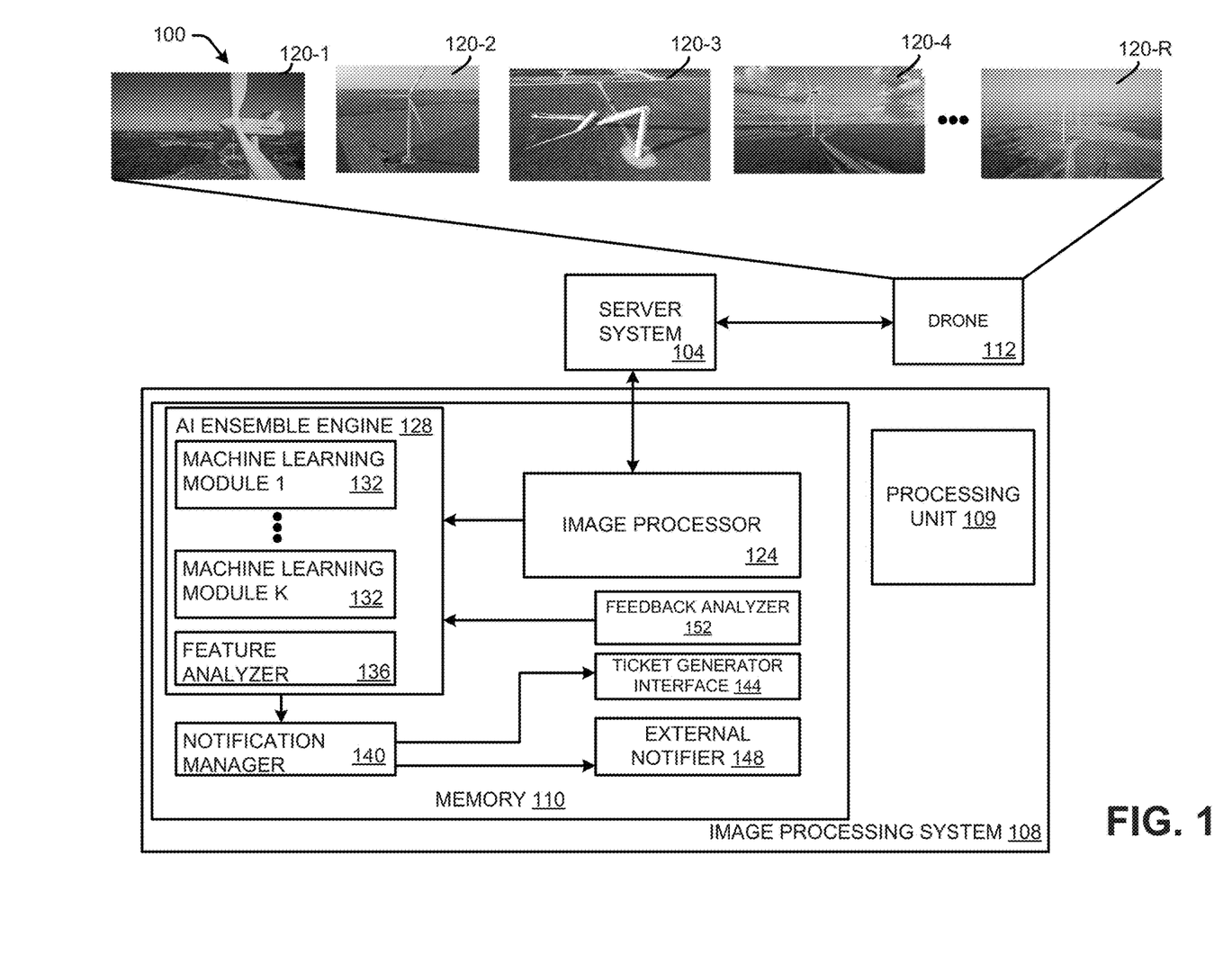
FIG. 1 illustrates a system for processing images characterizing a wind farm and/or a plant farm.

FIG. 1 illustrates a system for processing images characterizing a wind farm and/or a plant farm. The system 100 includes a server system 104 and an image processing system 108. The server system 104 can be implemented as one or more computing devices, such as one or more servers that execute application software on top of an operating system. That is, the server system 104 may be implemented as a combination of hardware and software. The server system 104 is configured to send control commands to a drone 112 that captures images of N number of wind turbines that form a windfarm, where N is an integer greater than or equal to one (1). The drone 112 also captures images of a plant farm. As used herein, the term plant farm refers to a tract of land devoted to the controlled growing of vegetation (e.g., agricultural purposes). Plant farms include, but are not limited to vegetable crops, trees, bushes, etc. Frequently, windfarms are proximal to plant farms. Thus, images capture by the drone 112 can include portions of the N number of wind turbines in the wind farm, partitions of the proximal plant farm or both.

In some examples, the server system 104 can be controlled by a third party, such as an original equipment manufacturer (OEM) of the drone 112. In other examples, the server system 104 can be implemented as a SCADA system (supervisory control and data acquisition system). In still other examples, the server system 104 can be representative of a combination of a third party server and a SCADA system operating in concert. The commands are sent to the drone 112 for example, with a wireless connection. The windfarm is coupled to a power grid, and an output power level of the windfarm may be monitored by a substation meter. In this manner, the N number of wind turbines generate power that is provided to the power grid.

The image processing system 108 can also be implemented as a computing device, such as one or more servers that execute application software on top of an operating system. That is, the image processing system 108 can include a processing unit 109 (e.g., one or more processing cores) and a non-transitory memory 110 that stores machine readable instructions. The non-transitory memory 110 is implemented as a non-transitory machine readable medium (volatile and/or non-volatile memory), such as random access memory (RAM), a hard disk drive, a solid state drive, flash memory or a combination thereof. The processing unit 109 can access the non-transitory memory 110 and execute machine readable instructions.

In some examples, the server system 104 and the image processing system 108 can communicate over a network (e.g., a public network, such as the Internet or a proprietary network, such as a utility network) through a network interface. In other examples, the server system 104 and the image processing system 108 can be integrated and operate on the same computing system. The image processing system 108 and/or the server system 104 could be implemented in a computing cloud. In such a situation, features of the image processing system 108 and/or the server system 104, such as the processing unit 109, the network interface, and the memory 110 could be representative of a single instance of hardware or multiple instances of hardware with applications executing across the multiple of instances (i.e., distributed) of hardware (e.g., computers, routers, memory, processors, or a combination thereof). Alternatively, the image processing system 108 and/or the server system 104 could be implemented on a single dedicated server.

The drone 112 is configured to periodically and/or asynchronously trek through the windfarm and the surrounding plant farm and capture R number of images 120 (a set of images), where R is an integer greater than or equal to one (1). Each of the R number of images 120 also includes an index number, j that allows the images 120 to be uniquely identified. Accordingly, the first image is labeled as 120-1 and the Rth image is labeled as 120-R. The drone 112 can add metadata to each of the R number of images 120. The metadata can include, but is not limited to location data, and a timestamp. The location data can be, for example latitude and longitude coordinates.

In some examples, plant farm operators (e.g., land owners or tenants) of a plant farm proximal to the wind farm can subscribe to services for the drone 112 to survey the plant farm. Stated differently, in some examples, the plant farm operators can subscribe to a service to have the drone 112 periodically and/or asynchronously survey the plant farm to search for problem areas that need to be addressed.

The drone 112 uploads the R number of images 120 to the server system 104. For purposes of simplification of explanation, it is presumed that the drone 112 uploads every captured image to the server system 104, but it is understood that in some examples, the drone 112 may upload a subset of the R number of images 120.

In response, the server system 104 can provide the uploaded images to the image processing system 108. The image processing system 108 includes an image processor 124 that can parse the R number of images 120 to identify images for analysis by an artificial intelligence (AI) ensemble engine 128. In some examples, the image processor 124 removes images from the R number of images 120 that are overexposed or underexposed, thereby lacking sufficient detail. Similarly, the image processor 124 can remove images from the R number of images 120 that lack sufficient information. For instance, an image of the sky without a portion of a wind turbine and/or a partition of the plant farm may be removed. The remaining P number of images are provided to the AI ensemble engine 128, where P is an integer less than or equal to R (e.g., P≤R).

The AI ensemble engine 128 can operate as a software module of the image processing system 108. Further, it is understood that although the system 100 depicts the image processor 124 and the AI ensemble engine 128 as operating on the same computing system (the image processing system 108), in other examples, the AI ensemble engine 128 and the image processor 124 can operate on separate systems that communicate via a network.

The AI ensemble engine 128 can include K number of machine learning modules 132, where K is an integer greater than or equal to one (1). Each of the K number of machine learning modules 132 can implement a different type (e.g., algorithm) of machine learning. As one example, there could be six (6) machine learning modules 132. In such a situation, the K number of machine learning modules 132 can include a trained neural network, such as a Deep Learning Network (e.g., a multilayer neural network), a convolutional neural network (CNN), a recurrent neural network (RNN), a Deep Belief Network (DBN), etc. In other examples, a subset of these machine learning techniques can be employed.

A deep learning neural network combines low-level features to form more abstract high-level representations of attribute categories or features, thereby producing a distributed feature representation of the data. Suppose a system, S has n layers where n is an integer greater than or equal to one, with an input, I and an output, O, a neural network procedure can be expressed with Equation 1.

$$I \rightarrow S_1 \rightarrow S_2 \rightarrow \ldots \rightarrow S_n \rightarrow O \qquad \text{Equation 1:}$$

As demonstrated in Equation 1, if the output, O is equal to the input, I (e.g., the input, I does not change after traversing through the system, S), no information is lost when the input, I passes through each layer, $S_i$ or the lost information is redundant. Stated differently, the output of $S_i$ at any layer is another form of the input, I. Accordingly, a neural network enables a hierarchical representation of the input information by superposing multiple layers with the output of the previous layer being used as the input for the next layer. This enables parameters to be adjusted to obtain a series of hierarchical features for each layer, $S_i$.

As noted, the K number of machine learning modules 132 can include a CNN, an RNN, a deep learning network and/or a DBN. In an example where a given machine learning module 132 is a CNN, the given machine learning module 132 has an ability to represent learned features and can conduct shift-invariant classification of input information according to the hierarchical structure of the CNN. Through convolution and pooling operations, the given machine learning module 132 can automatically learn the features of images at different levels. For instance, the given machine learning module 132 can learn the features of the K number of images 120 color and brightness. In a deeper layer, the given machine learning module 132 obtains details of the K number of images 120, such as edges corners and lines. In yet another layer, the given machine learning module 132 acquires complex information and structures such as texture and geometry. The learning process of the given machine learning module 132 includes three parts, the first part is an input layer, the second part is formed of a combination of n convolutional layers and a pooling layer. The third part is a fully connected multi-layer perceptron classifier.

Figure 2:
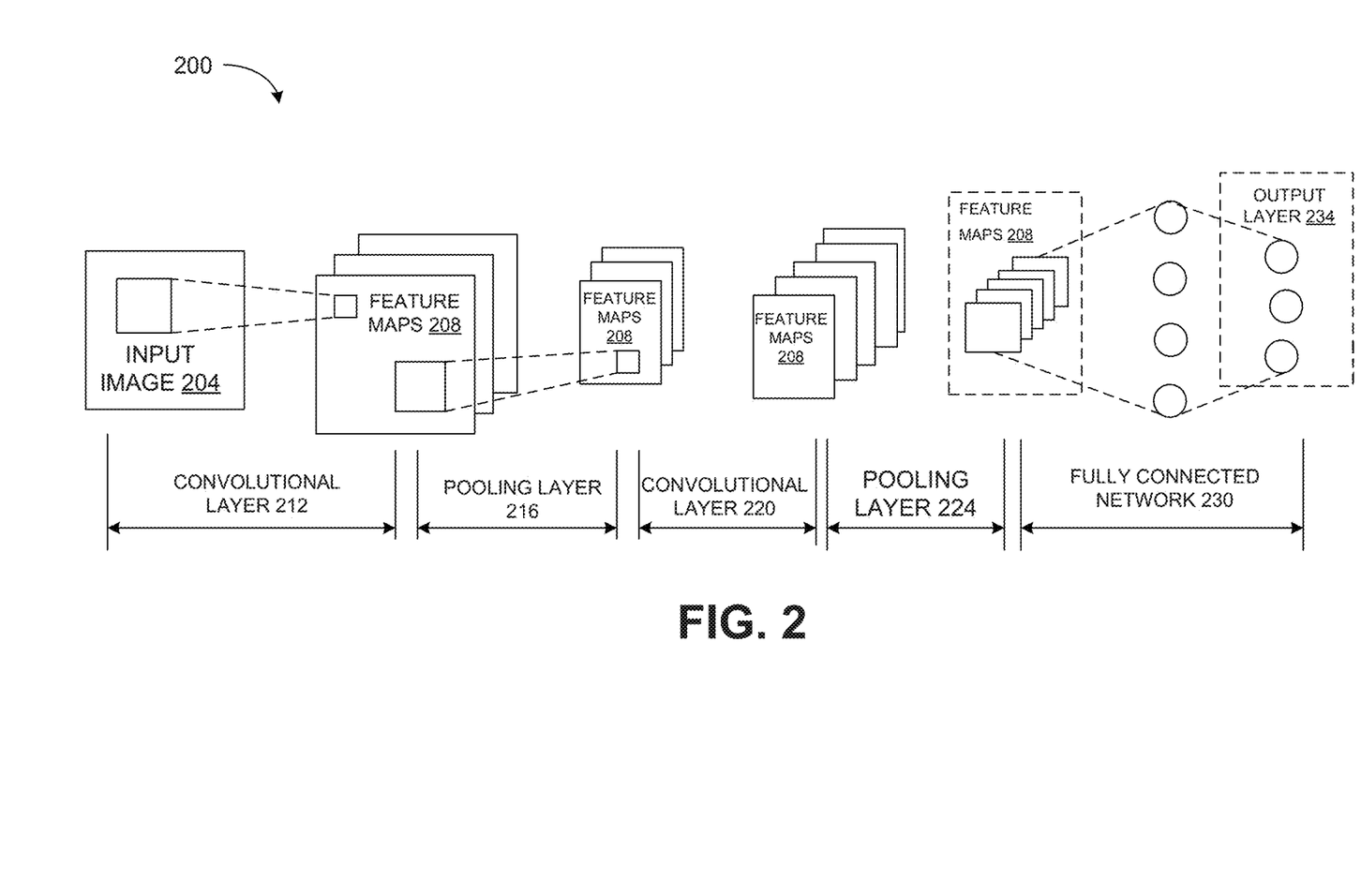
FIG. 2 illustrates a diagram of an example of a convolutional neural network (CNN) that is employable as a machine learning module.

FIG. 2 illustrates a diagram 200 of an example of a CNN that is employable as the given machine learning module 132 of FIG. 1. To ensure that feature extraction is accurate, network layers making up the second and third parts (the n convolutional layers and the pooling layer) as is dictated by the task being executed (identifying features related to wind turbines and plant farms). The formal representation of a CNN is characterized with Equation 2.

$$\text{INPUT} \rightarrow [[\text{CONV}]*n \rightarrow \text{POOL?}]*m \rightarrow [\text{FC}]*k \qquad \text{Equation 2:}$$

Wherein:
CONV denotes a convolution layer that overlaps up to n times;
POOL denotes an affixed pooling layer that may be omitted in some examples;
m and k are positive integers; and
FC denotes a full connection layer that is iterated k times.

Per Equation 2, the core CNN is formed of multiple convolutional layers, and each convolutional layer contains multiple convolutional kernels. These kernels can scan an input image 204 from left to right (or vice versa) from top to bottom (or vice versa) to obtain the output data, which is referred to as feature map 208. The first convolutional layer 212 in the network captures local detailed information about an image, which each pixel of the output image using the information contained in the input image 204 is provided to a pooling layer 216. The subsequent convolutional layers 220 and pooling layers 224 are employed to capture more complex and abstract information. Once the input image 204 has traversed several convolutional layers 212 and 216, an abstract representation of the images can be obtained at different levels of a fully connected network 230 that include an output layer 234.

Referring back to FIG. 1, each of the K number of machine learning modules 132 are trained in image recognition of features related to both wind turbines and plant farms. As noted, in many instances, the windfarm is proximal to a plant farm (or multiple plant farms). Thus, the K number of machine learning modules 132 are trained to distinguish features in images related to wind turbines from features related to plant farms.

Figure 3:
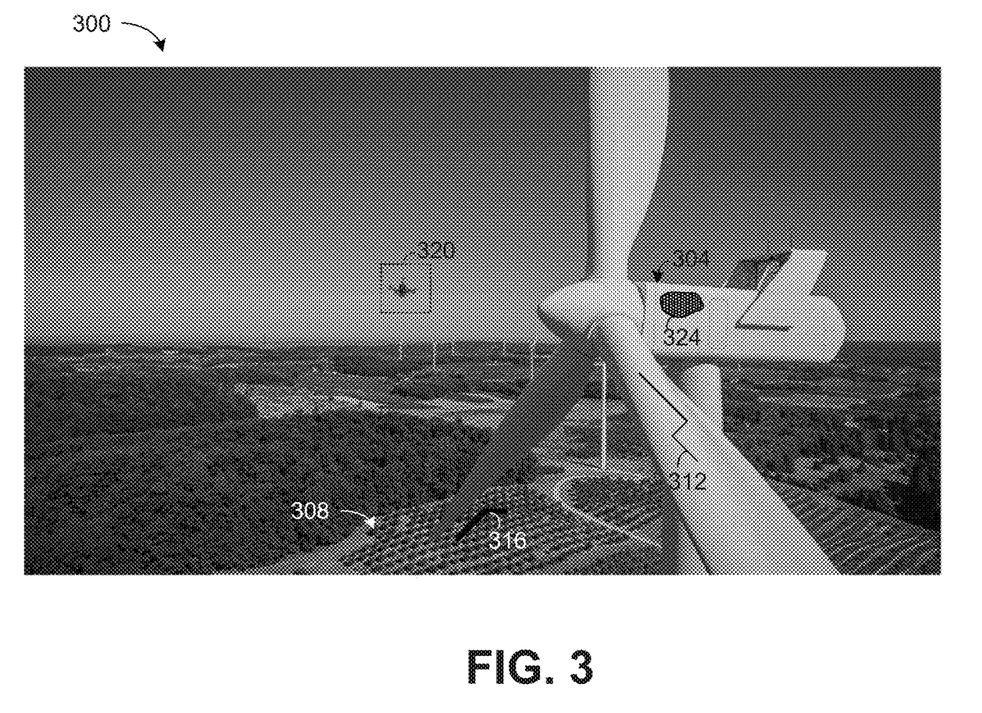
FIG. 3 illustrates an image that is an expanded view of a first image captured by a drone.

FIG. 3 illustrates an image 300 that is an expanded view of the first image 120-1 of FIG. 1 captured by the drone 112. The image 300 includes features related to both a wind turbine 304 and a plant farm 308. More particularly, the wind turbine 304 includes a crack 312. Additionally, the plant farm 308 includes an erosion region 316. Further, the image 300 includes a drone 320 that represents, for example, another drone. Still further, the wind turbine 304 includes a hot spot 324.

Figure 4:
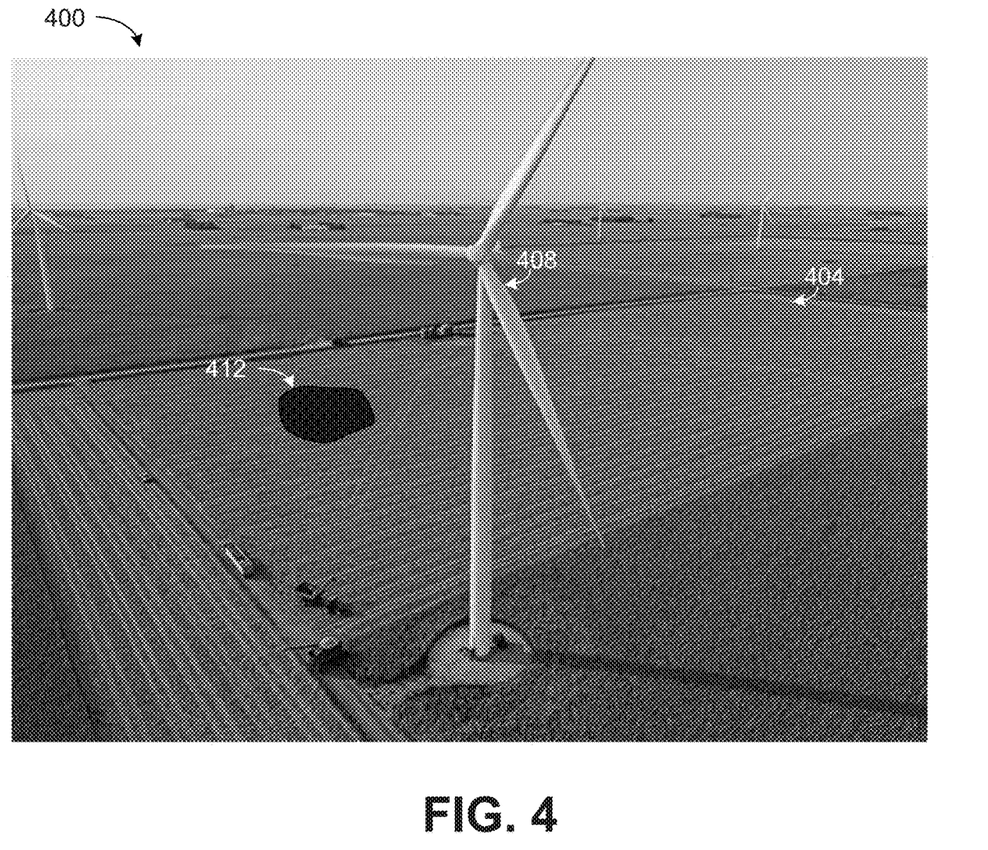
FIG. 4 illustrates an image that is an expanded view of a second image captured by a drone.

FIG. 4 illustrates an image 400 that is an expanded view of the second of the R number of images 120 capture by the drone 112, namely image 120-2. The image 400 includes a plant farm 404 and a wind turbine 408. The plant farm 404 includes a dead spot 412.

Figure 5:
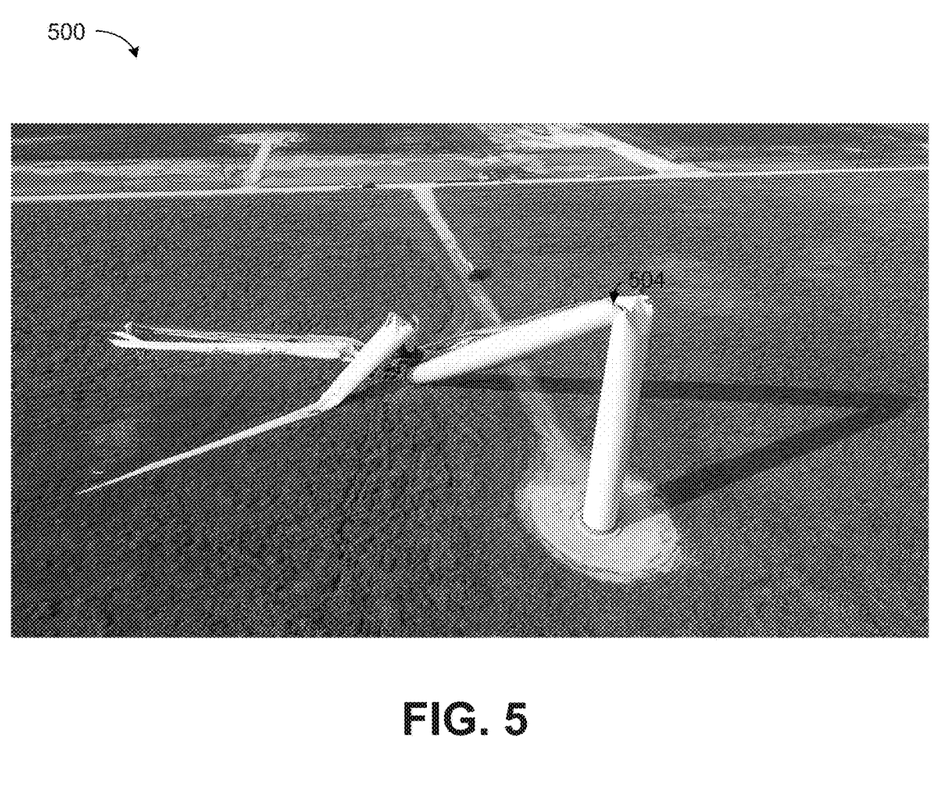
FIG. 5 illustrates an image that is an expanded view of a third image captured by a drone.

FIG. 5 illustrates an image 500 that is an expanded view of the third of the R number of images 120 captured by a drone, namely image 120-3. The image 500 includes a wind turbine 504 after collapsing. The wind turbine 504 has experienced a "catastrophic failure" and is proximal to a plant farm.

Figure 6:
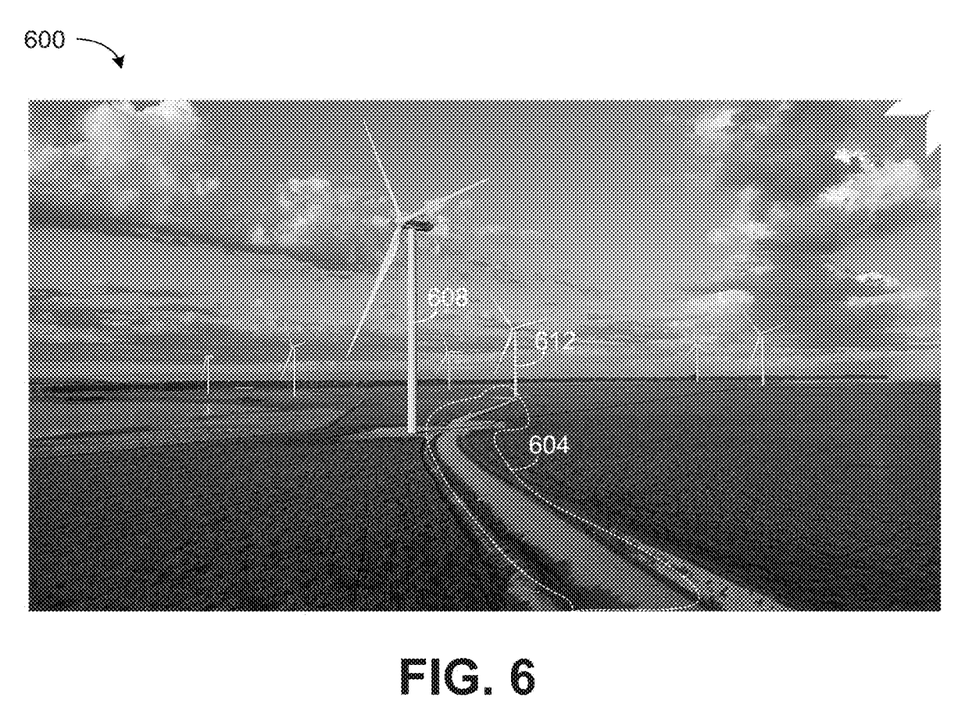
FIG. 6 illustrates an image that is an expanded view of a fourth image captured by a drone.

FIG. 6 illustrates an image 600 that is an expanded view of the fourth of the R number of images 120 captured by the drone 112, namely, image 120-4. The image 600 includes a partially above-ground conduit 604 extending between a first wind turbine 608 and a second wind turbine 612 of a wind farm that is proximal to a plant farm.

Figure 7:
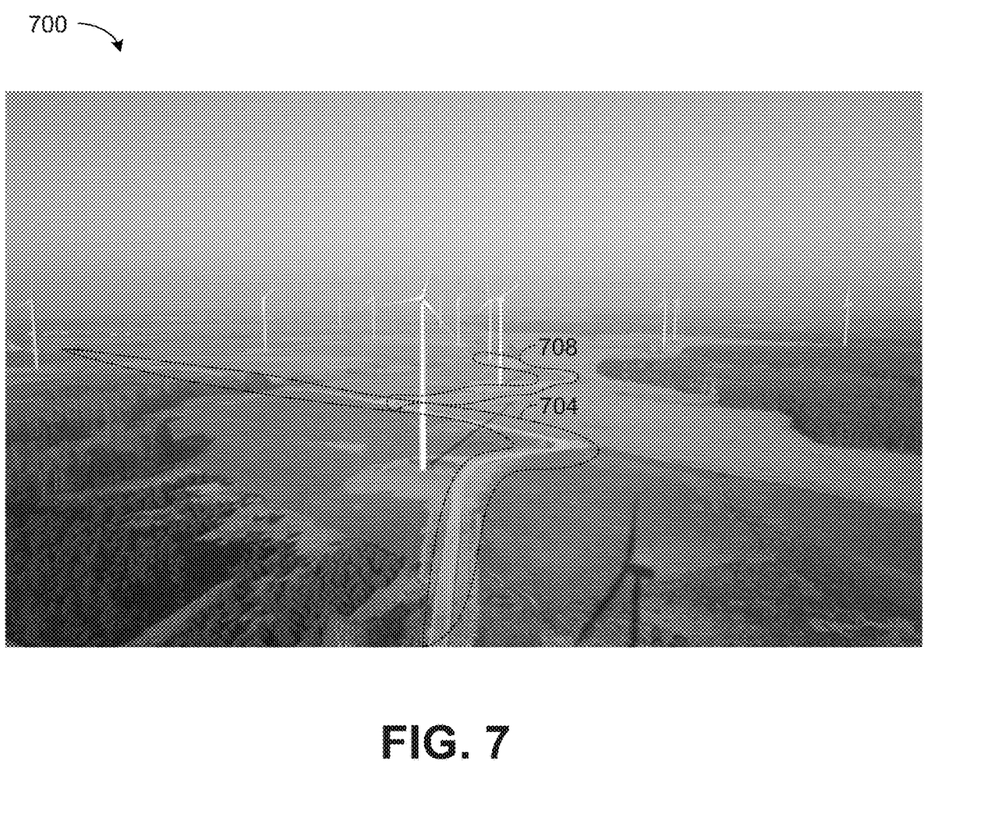
FIG. 7 illustrates an image that is an expanded view of a fifth image captured by a drone.

FIG. 7 illustrates an image 700 that is an expanded view of the Rth image of the R number of images 120 captured by the drone 112, namely, image 120-R. The image 700 includes a first access road 704 and a second access road 708 (connected to the first access road 704) that winds between wind turbines on a wind farm that is proximal to a plant farm.

Referring back to FIG. 1, each of the K number of machine learning modules 132 can analyze the P number of images 120 (a subset of the R number of images 120 captured by the drone 112) that include a wind turbine and a region of a plant farm to identify potential problem areas in the wind turbine and the plant farm. As illustrated in FIG. 3, the image 300 (corresponding to the first image 120-1), the wind turbine 304 includes the crack 312 and the plant farm 308 includes the erosion region 316. The K number of machine learning modules 132 are trained to correctly attribute the crack 312 to the wind turbine and to attribute the erosion region 316 to the plant farm. Due to the commonality of the overall shape of the crack 312 and the erosion region 316, conventional machine learning modules misattribute the crack 312 to erosion in a plant farm and/or misattribute the erosion region 316 to a crack on a wind turbine of a wind farm.

Similarly, the K number of machine learning modules 132 are trained to correctly attribute the hot spot 324 to the wind turbine 304 illustrated in FIG. 3. Conventional machine learning modules trained only for plant farms may misattribute the hot spot 324 to a dead spot in the plant farm. Additionally, as another example, the K number of machine learning modules 132 are trained to correctly attribute the dead spot 412 of the image 400 of FIG. 4 (corresponding to the second image 120-2) to the plant farm. Conventional machine learning modules trained only for wind farms may misattribute the dead spot 412 to a hot spot on the wind turbine 408.

Further, as still another example, the K number of machine learning modules 132 are trained to correctly identify the collapsed wind turbine 504 in the image 500 of FIG. 5 (corresponding to the third image 120-3). A conventional machine learning module trained only for plant farms may misattribute the collapsed wind turbine 504 to a fallen tree.

As yet another example, the K number of machine learning modules 132 are trained to correctly identify the partially above-ground conduit 604 of the image 600 in FIG. 6 (corresponding to the fourth image 120-4). A conventional machine learning module trained only for plant farms may misattribute the partially above-ground conduit 604 to an irrigation system.

In still another example, the K number of machine learning modules 132 are trained to correctly identify the first access road 704 and the second access road 708 of the image 700 of FIG. 7 (corresponding to the Rth image 120-R). A conventional machine learning module trained only for plant farms may misattribute the first access road 704 and/or the second access road 708 as an area allocated for crop growth/tilling.

The K number of machine learning modules 132 are configured to identify potential problem areas from the P number of images 120 captured by the drone 112. As noted, the potential problem areas can be potential problems related to operations of wind turbines or problems related to agriculture.

The AI ensemble engine 128 also includes a feature analyzer 136 that receives data from each of the K number of machine learning modules 132 (or some subset thereof) characterizing potential problem areas (e.g., cracks, hot spots, erosion regions and/or dead spots) identified in the P number of images 120. The feature analyzer 136 determines whether action is needed to remedy the problem areas identified in the P number of images 120. Stated differently, the feature analyzer 136 analyzes the potential problem areas of the wind turbine and the plant farm to determine whether maintenance is warranted for each of the potential problem areas to provide a list of problem areas (which is a subset of the potential problem areas). For instance, in a situation where a crack on a wind turbine is identified, the feature analyzer 136 can analyze the crack to determine if the crack is large enough to require maintenance. Similarly, in a situation where a dead spot on a plant farm is identified, the feature analyzer 136 can determine if the dead spot is sufficiently large to warrant maintenance. Still further, in a situation where a wind turbine has collapsed, the feature analyzer 136 can determine that the wind turbine needs maintenance.

Additionally, the feature analyzer 136 can be configured to determine if some of the features identified by the machine learning modules 132 have been misattributed. For instance, if a given machine learning module 132 reports detection of a crack in a wind turbine that exceeds a threshold size, the feature analyzer 136 can determine that the reported crack of the wind turbine is actually an erosion area in the plant farm. Moreover, in these examples, the feature analyzer 136 can provide data to the subset of the K number of machine learning modules 132 that reported the misattributed crack indicating the misattribution. In response, the subset of the K number of feature analyzers 136 can tune their parameters to reduce the likelihood that future analysis of a similar misattributed feature is likely to occur. In this manner, the AI ensemble engine 128 employs reinforcement learning to increase the accuracy of the K number of machine learning modules 132.

The feature analyzer 136 creates a list of problem areas (a subset of the list of potential problem areas) that need maintenance, and provides the list to a notification manager 140. The notification manager 140 determines what entity is needed to provide the maintenance. More specifically, the notification manager 140 determines whether each problem area in the list of problem areas is related to a wind turbine or agriculture and generates a notification based on that determination. For example, if a given problem area of the list of problem areas is on a wind turbine, the notification manager 140 determines that a service crew is to be dispatched to the wind turbine to remedy the given problem area (wherein the location of the wind turbine is extracted from metadata embedded in the corresponding image 120).

The notification manager 140 generates a notification commensurate with a problem area of the list of problem areas that needs maintenance, and provides the notification to a ticket generator interface 144 or an external notifier 148. The notification can include, for example, an image of the problem area and a location of the problem area. For example, if the notification manager 140 determines that a turbine maintenance crew is needed for a given wind turbine (the location of the given problem area), the notification manager 140 provides the notification to the ticket generator interface 144. In response, the ticket generator interface 144 generates a service ticket with a dispatch order for a maintenance crew to the given wind turbine.

Conversely, in situations where the notification manager 140 determines that agricultural maintenance is needed for a given problem area in the list of problem areas, the notification manager 140 provides the notification to an external notifier 148. For example, in a situation where a road between wind turbines is identified, if vegetation has encroached on the road, the notification manager 140 can generate a notification identifying the type of maintenance needed (e.g., vegetation trimming) and a location of the needed maintenance (extracted as metadata from a corresponding image). The notification can include an image of the given problem area and a location of the given problem area. In response to the notification, the external notifier 148 sends a notification to a service subscriber (e.g., a landowner or a tenant) of a region that includes the problem area. Such a notification can be, for example, an email and/or a short message service (SMS) message.

Further, in some examples, upon visual inspection of a reported problem area, in some instances, it may be determined that a feature was misattributed and/or the reported problem area did not need maintenance. For instance, in some examples, visual inspection of an image included with a service ticket or notification (e.g., email and/or SMS message) may reveal, for example, that erosion reported in a plant farm is actually a crack in a wind turbine. Similarly, in some examples, upon dispatch of a service crew (or land care taker) to a reported problem area, visual inspection of the reported problem area may reveal that a reported problem area does not warrant maintenance. For instance, consider a situation where a service ticket reports a crack (which is visible in an image included with the service ticket), and a service crew is dispatched to inspect the crack. In this situation, suppose that the crack is actually dirt/mud present on the wind turbine that appears to be a crack. In any of these situations, feedback of the situation can be reported to a feedback analyzer 152 stored in the non-transitory memory 110. The feedback analyzer 152 can provide feedback data to the AI ensemble engine 128 indicating that a problem area had been misdiagnosed, and the reason for the misdiagnosis. In response, the AI ensemble engine 128 can update the K number of machine learning modules 132 and/or the feature analyzer 136 based on the feedback data. Accordingly, in the future, the AI ensemble engine 128 can more accurately identify the problem areas. In this manner, the feedback data initiates reinforcement learning on the K number of machine learning modules 132 and the feature analyzer 136.

By employment of the system 100, the same drone 112 can be employed to capture images that include both wind turbines of a windfarm, and a region of a plant farm. Due to the proximal relationship that is common between windfarms and plant farms, conventionally, it is common to misattribute features related to wind turbines to plant farms, and vice versa. In contrast, the AI ensemble engine 128 includes the K number of machine learning modules 132 that are specifically trained to recognize the problem areas associated with both wind turbines and plant farms. Accordingly, the K number of machine learning modules 132 avoid problems associated with conventional approaches that include machine learning models trained for only one purpose.

Figure 8:
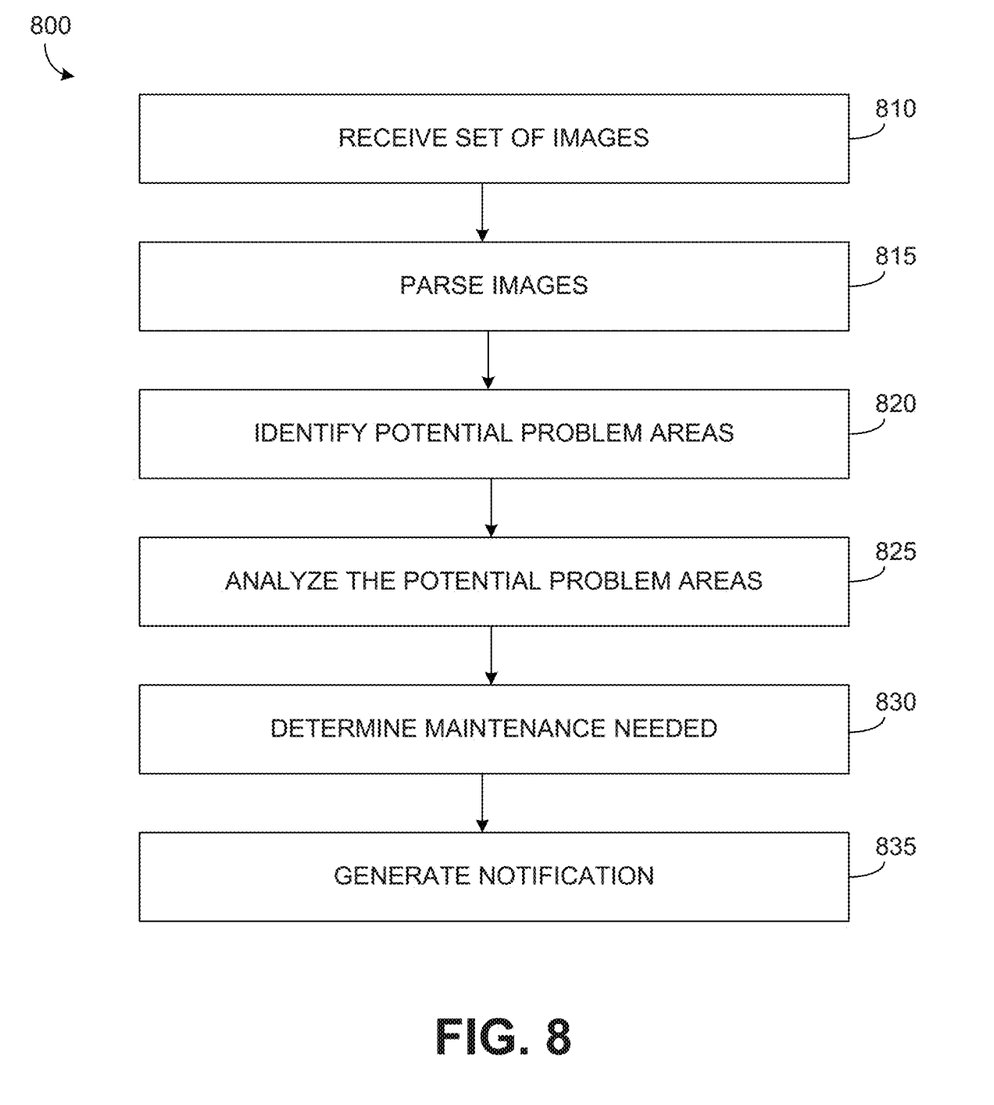
FIG. 8 illustrates a flowchart of an example method for processing images of a wind farm and a plant farm.

In view of the foregoing structural and functional features described above, an example method will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 8 illustrates a flow diagram of an example method 800 for processing images received from a drone (e.g., the drone 112 of FIG. 1) surveying a wind farm proximal to a plant farm or vice versa. Accordingly, images captured by the drone possibly include both an image of a wind turbine and an image of a portion of a plant farm.

At 810, an image processing system (e.g., the image processing system 108 of FIG. 1) receives a set of images (e.g., R number of images) from a server system (e.g., the server system 104 of FIG. 1) that are captured by the drone. At 815, an image processor operating on the image processing system parses the images to identify images for analysis by an AI ensemble engine (e.g., the AI ensemble engine 128 of FIG. 1) and removes images that lack sufficient information (e.g., due to lack of light or over exposure to light) for analysis. A remaining number of the images are provided to the AI ensemble engine.

At 820, K number of machine learning modules (e.g., the K number of machine learning modules 132 of FIG. 1) analyze the provided images to identify potential problem areas in the images. The K number of machine learning modules are specifically trained to avoid misattributing features related to wind turbines to features related to plant farms, or vice versa, as described herein.

At 825, a feature analyzer (e.g., the feature analyzer 136 of FIG. 1) analyzes the potential problem areas and identifies problem areas included in the potential problem areas are provided and determines when and/or if maintenance is needed on some or all of the potential problem areas. That is, the feature analyzer identifies the severity of potential problems and determines if immediate maintenance is needed. For instance a hairline crack in a wind turbine may not need immediate maintenance (e.g., not a problem area), but a collapsed wind turbine would (e.g., problem area).

At 830, a notification manager (e.g., the notification manager 140 of FIG. 1) determines the type of maintenance needed to address issues at the problem areas. The type of maintenance can be, for example, maintenance for a wind turbine crew or maintenance for a plant farm. At 835, the notification manager generates a notification to execute the maintenance for a specific problem area.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions causing a processor to execute operations, the machine executable instructions comprising:
   an image processor configured to parse a set of images to generate a subset of images by discarding images without a portion of a wind turbine and a region of a plant farm;
   an artificial intelligence (AI) ensemble engine having a number of modules trained to distinguish features of the portion of the wind turbine and the region of the plant farm, the AI ensemble engine:
      analyzes the features of the subset of images that include the portion of the wind turbine and the region of a plant farm to identify potential problem areas in the wind turbine and the plant farm; and
      analyzes the potential problem areas of the wind turbine and the plant farm to determine whether maintenance is warranted for the potential problem areas to provide a list of problem areas; and
   a notification manager that determines whether each problem area in the list of problem areas is related to a wind turbine or agriculture of the plant farm and generates a notification to a turbine operator or a plant farm operator based on the determination.

2. The medium of claim 1, wherein the notification manager provides the notification to a ticket generator interface in response to determining that a given problem area in the list of problem areas is related to a wind turbine, wherein the notification includes a location of the wind turbine extracted from a given image of the subset of images.

3. The medium of claim 2, wherein the ticket generator interface generates a service ticket with an order to dispatch a maintenance crew in response to the notification.

4. The medium of claim 2, wherein the given problem area is a crack in the wind turbine.

5. The medium of claim 2, wherein the given problem area is a hot spot on the wind turbine.

6. The medium of claim 1, wherein the notification manager provides a short message service (SMS) message and/or an email to the plant farm operator in response to determining that a given problem area in the list of problem areas is related to the plant farm, wherein the notification includes an image of the given problem area extracted from the subset of images.

7. The medium of claim 6, wherein the given problem area is a dead spot on the plant farm.

8. The medium of claim 6, wherein the given problem area is a collapsed wind turbine.

9. The medium of claim 1, wherein the subset of images are captured by a drone surveying the wind turbine and the plant farm.

10. A system for analyzing images comprising:
a drone that captures a set of images, the set of images including images of a wind turbine on a wind farm and images of a plant farm proximal to the wind farm;
an image processor configured to parse a set of images to discard images without a portion of the wind turbine and a region of a plant farm to generate a subset of images;
an artificial intelligence (AI) ensemble engine operating on one or more computing devices having a memory storing executable instructions executed on a processor that cause the AI to:
distinguish features of the portion of the wind turbine and the region of the plant farm;
analyze the features of the subset of images to identify potential problem areas with the wind turbine and the plant farm; and
analyze the potential problem areas of the wind turbine and the plant farm to determine whether maintenance is warranted for the potential problem areas to generate a list of problem areas; and
a notification manager operating on the one or more computing devices that determines whether each problem area in the list of problem areas is related to a wind turbine or agriculture of the plant farm and generates a notification to a turbine operator or a plant farm operator based on the determination.

11. The system of claim 10, wherein the notification manager provides the notification to a ticket generator interface in response to determining that a given problem area in the list of problem areas is related to a wind turbine, wherein the notification includes a location of the wind turbine extracted from a given image of the subset of images.

12. The system of claim 11, wherein the ticket generator interface generates a service ticket with an order to dispatch a maintenance crew in response to the notification.

13. The system of claim 11, wherein the given problem area is a crack in the wind turbine.

14. The system of claim 11, wherein the given problem area is a hot spot on the wind turbine.

15. The system of claim 11, wherein the notification manager provides a short message service (SMS) message and/or an email to the plant farm operator in response to determining that a given problem area in the list of problem areas is related to the plant farm, wherein the notification includes an image of the given problem area extracted from the subset of images.

16. The system of claim 15, wherein the given problem area is a dead spot on the plant farm.

17. The system of claim 15, wherein the given problem area is an erosion region on the plant farm.

18. A method for processing images comprising:
receiving, by an image processing system operating on one or more computing devices having a memory storing executable instructions to be executed by a processor, a set of images captured by a drone surveying a wind farm with wind turbines and/or a plant farm;
parsing, by the image processing system, a set of images to discard images without a portion of the wind turbine and a region of a plant farm to generate a subset of images;
identifying, by an artificial intelligence (AI) ensemble engine operating on the one or more computing devices, potential problem areas related to wind turbines or plant farms in the subset of images, wherein the AI ensemble engine is trained to recognize features related to wind turbines and plant farms;
analyzing, by a feature analyzer of the AI ensemble engine operating on the one or more computing devices, the potential problem areas to determine problem areas related to the wind turbines and/or the plant farm; and
determining, by a notification manager operating on the one or more computing devices, whether maintenance is needed for each problem area and generating a notification to a turbine operator or a plant farm operator based on the determination.

19. The method of claim 18, further comprising generating, by the notification manager, a notification that includes an image of a problem area and a location of the problem area.

20. The medium of claim 1, wherein features are low-level features, and the AI ensemble engine further:
combines low-level features to form high-level features and produce a distributed feature representation, and
identifying the high-level features as related to the portion of the wind turbine or the region of the plant farm based on the distributed feature representation.

* * * * *